(12) United States Patent
Takahashi

(10) Patent No.: US 6,997,491 B2
(45) Date of Patent: Feb. 14, 2006

(54) BUMPER MOUNTING STRUCTURE

(75) Inventor: Makoto Takahashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/146,673

(22) Filed: Jun. 7, 2005

(65) Prior Publication Data
US 2006/0001279 A1 Jan. 5, 2006

(30) Foreign Application Priority Data
Jul. 2, 2004 (JP) .............................. 2004-196656

(51) Int. Cl.
B60R 19/24 (2006.01)
(52) U.S. Cl. ..................................... 293/154; 296/198
(58) Field of Classification Search ................ 293/154; 296/198
See application file for complete search history.

(56) References Cited

U.S. PATENT DOCUMENTS 6,776,450 B1 * 8/2004 Okubo et al. ............ 296/146.9

FOREIGN PATENT DOCUMENTS

| JP | 57018540 A | * | 1/1982 | ................ 293/154 |
| JP | 60004443 | * | 1/1985 | ................ 293/154 |
| JP | 2003-011752 | | 1/2003 | |

* cited by examiner

Primary Examiner—Jason Morrow
(74) Attorney, Agent, or Firm—Rankin, Hill, Porter & Clark LLP

(57) ABSTRACT

A bottom plate mounting hole is formed in one end side of a bottom plate portion of the fender panel with this bottom plate portion forming a line of partition between the fender panel and the bumper. A side plate mounting hole is also formed in the fender panel facing an inward surface in the vehicle transverse direction of the bumper. An upward protruding portion that is rotatably fittable in the bottom plate mounting hole is formed on one end side of the bumper spacer. A sideways protruding portion is also formed on the bumper spacer that, in a state in which the upward protruding portion has been fitted in the bottom plate mounting hole, is fittable into the side plate mounting hole as a result of the bumper spacer being rotated around the upward protruding portion. The bumper mounting structure enables a bumper spacer to be mounted accurately and easily on a fender panel.

4 Claims, 10 Drawing Sheets

BUMPER MOUNTING STRUCTURE

BACKGROUND OF THE INVENTION

1. Field of the Invention

Priority is claimed on Japanese Patent Application No. 2004-196656, filed Jul. 2, 2004, the contents of which are incorporated herein by reference.

The present invention relates to a bumper mounting structure for mounting a bumper onto a fender panel via a bumper spacer.

2. Description of Related Art

Technology relating to a bumper mounting structure that enables a bumper to be mounted onto a fender panel via a bumper spacer exists in which a side plate mounting hole is formed in a side plate portion of a fender panel that faces an inward surface in the vehicle transverse direction of the bumper, and a sideways protruding portion is formed in a bumper spacer, and the bumper spacer is fitted via the sideways protruding portion thereof in the side plate mounting hole of the fender panel. Subsequently, the bumper is fitted in the bumper spacer, and the bumper is then bolted onto the bumper spacer (see Japanese Patent Application Unexamined Publication No. 2003-11752).

In a structure that fits a sideways protruding portion of a bumper spacer in a side plate mounting hole in a fender panel such as that described above, the accuracy of the mounting of the bumper spacer in the fender panel is insufficient. Consequently, in order to further improve this mounting accuracy, it is effective if, in addition to the above structure, a bumper spacer is also mounted on a bottom plate portion that forms a line of partition between the fender panel and the bumper. In this case, because the direction in which the bumper spacer is fitted to the side plate portion of the fender panel and the direction in which the bumper spacer is fitted to the bottom plate portion of the fender panel are different, in order to avoid interference, it is necessary for a grommet, which is a separate component, to firstly be mounted in the mounting hole in the bottom plate of the fender panel, and for the sideway protruding portion of the bumper spacer to then be fitted into the side plate mounting hole in the fender panel. The bumper spacer is then mounted in the bottom plate mounting hole in the bottom plate portion of the fender panel using a grommet pin or the like.

However, in the above described method, it is necessary for a grommet to be mounted in the bottom plate mounting hole in the fender panel, so that the problem arises that the task of performing this mounting becomes complex. Moreover, when the sideway protruding portion of the bumper spacer is being fitted in the side plate mounting hole in the fender panel, the bumper spacer obstructs the line of sight of the operator, which also increases the complexity of the mounting operation.

Accordingly, it is an object of the present invention to provide a bumper mounting structure that enables a bumper spacer to be mounted accurately and easily on a fender panel.

SUMMARY OF THE INVENTION

In order to achieve the above object, according to the present invention, there is provided a bumper mounting structure for mounting a bumper (for example, the bumper 15 in the embodiment) on a fender panel (for example, the fender panel 13 in the embodiment) via a bumper spacer (for example, the bumper spacer 14 in the embodiment), which comprises: a bottom plate mounting hole (for example, the bottom plate mounting hole 26 in the embodiment) provided in one end side of a bottom plate portion (for example, the bottom plate portion 22 in the embodiment) of the fender panel, the bottom plate portion forming a line of partition between the fender panel and the bumper; a side plate mounting hole (for example, the side plate mounting hole 27, 28 in the embodiment) provided in a side plate portion (for example, the side plate portion 23 in the embodiment) of the fender panel facing an inward surface (for example, the inward surface 24 in the embodiment) in a vehicle transverse direction of the bumper, an upward protruding portion (for example, the upward protruding portion 38 in the embodiment) that is rotatably fittable in the bottom plate mounting hole, provided on one end side of the bumper spacer, and a sideways protruding portion (for example, the sideways protruding portion 47, 48 in the embodiment) provided on the bumper spacer that, in a state in which the upward protruding portion has been fitted in the bottom plate mounting hole, is fittable into the side plate mounting hole when the bumper spacer is rotated around the upward protruding portion.

With the thus constructed bumper mounting structure, the upward protruding portion that is provided at one end side of the bumper spacer is fitted into the bottom plate mounting hole that is provided in one end side of the bottom plate portion, which forms a line of partition between the fender panel and the bumper. If the bumper spacer is then rotated around the upward protruding portion, the sideways protruding portion of the bumper spacer is fitted into the side plate mounting hole that is provided in the side plate portion of the fender panel that faces the inward surface in the vehicle transverse direction of the bumper. In this manner, because the bumper spacer is mounted via the sideways protruding portion onto the side plate portion of the fender panel, and is also mounted via the upward protruding portion onto the bottom plate portion of the fender panel, it is possible to improve the mounting accuracy. Accordingly, because it is not necessary to mount an independent grommet in the bottom plate mounting hole in the fender panel, the number of components can be decreased and the mounting task can be simplified. In addition, because the upward protruding portion that is provided at one end side of the bumper spacer is fitted into the bottom plate mounting hole that is provided in one end side of the bottom plate portion of the fender panel, visual confirmation is easy and the fitting is also made easy. Moreover, if the bumper spacer is subsequently rotated around the upward protruding portion, the sideways protruding portion can be automatically fitted into the side plate mounting hole in the fender panel. Accordingly, the mounting task can be further simplified.

Preferably, the bumper mounting structure as described above further comprises an oblique surface (for example, the oblique surface 55, 64 in the embodiment) formed on the sideways protruding portion on an opposite side thereof from the upwards protruding portion, the oblique surface eliminating interference between the sideways protruding portion and the side plate mounting hole during a rotation mounting.

With the thus constructed bumper mounting structure, because an oblique surface that prevents interference with the side plate mounting hole during the rotation mounting is formed on the sideways protruding portion on an opposite side thereof from the upward protruding portion, during the rotation mounting the sideways protruding portion can be prevented from interfering with the side plate mounting hole. Moreover, in an engaged state, the sideways protruding portion can be fitted into the side plate mounting hole with the minimum possible gap between them.

Preferably, in the bumper mounting structure as described above, the bumper spacer is molded integrally with the upward protruding portion and the sideways protruding portion.

With the thus constructed bumper mounting structure, because the bumper spacer is molded integrally with the upward protruding portion and the sideways protruding portion, the number of components can be decreased and a reduction in costs can be achieved.

DETAILED DESCRIPTION OF THE INVENTION

The bumper mounting structure of an embodiment of the present invention will now be described with reference made to the drawings. Note that the terms front and rear mentioned in the description below refer to the front and rear of a vehicle body. Moreover, directions for each component are taken, for the sake of convenience, as the directions of these components when they are in a mounted state.

Figure 1:
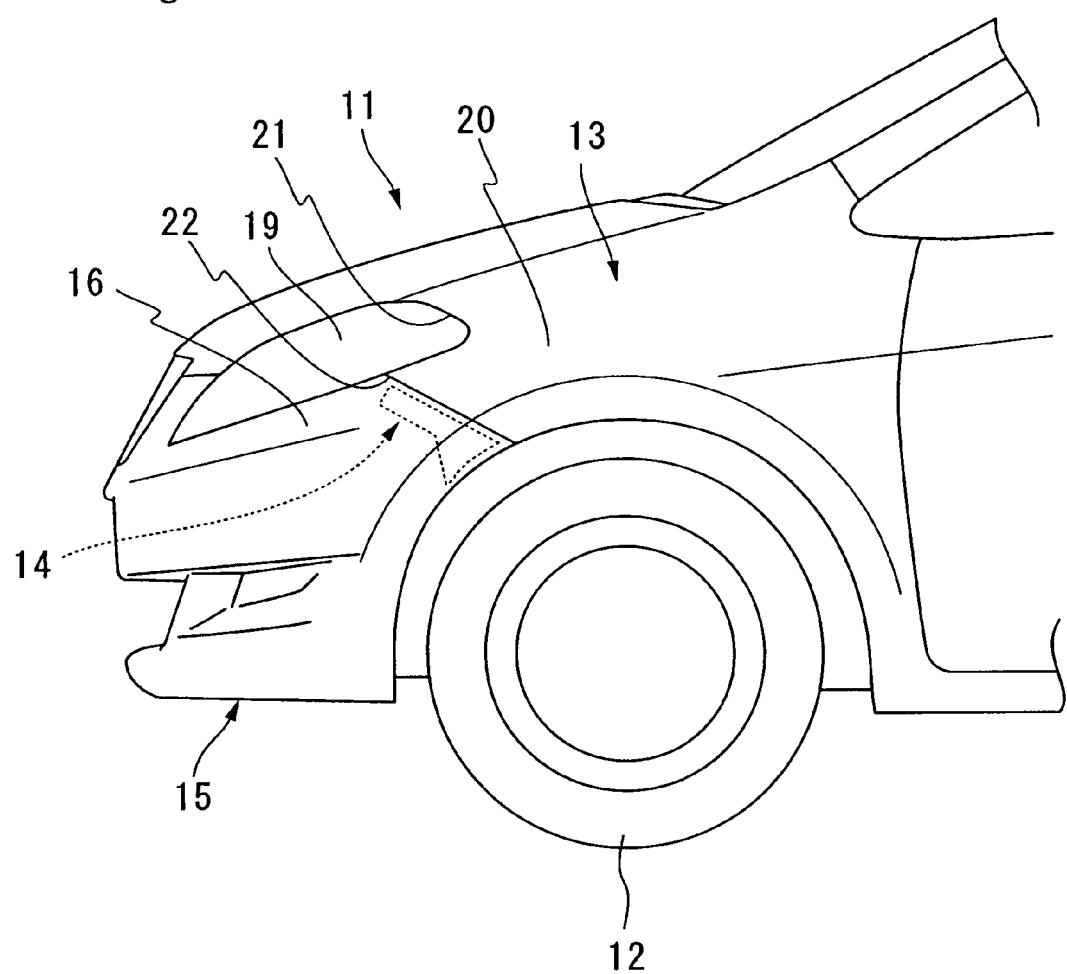
FIG. 1 is a side view showing a front portion of a vehicle in which the bumper mounting structure of an embodiment of the present invention is used.
Figure 2:
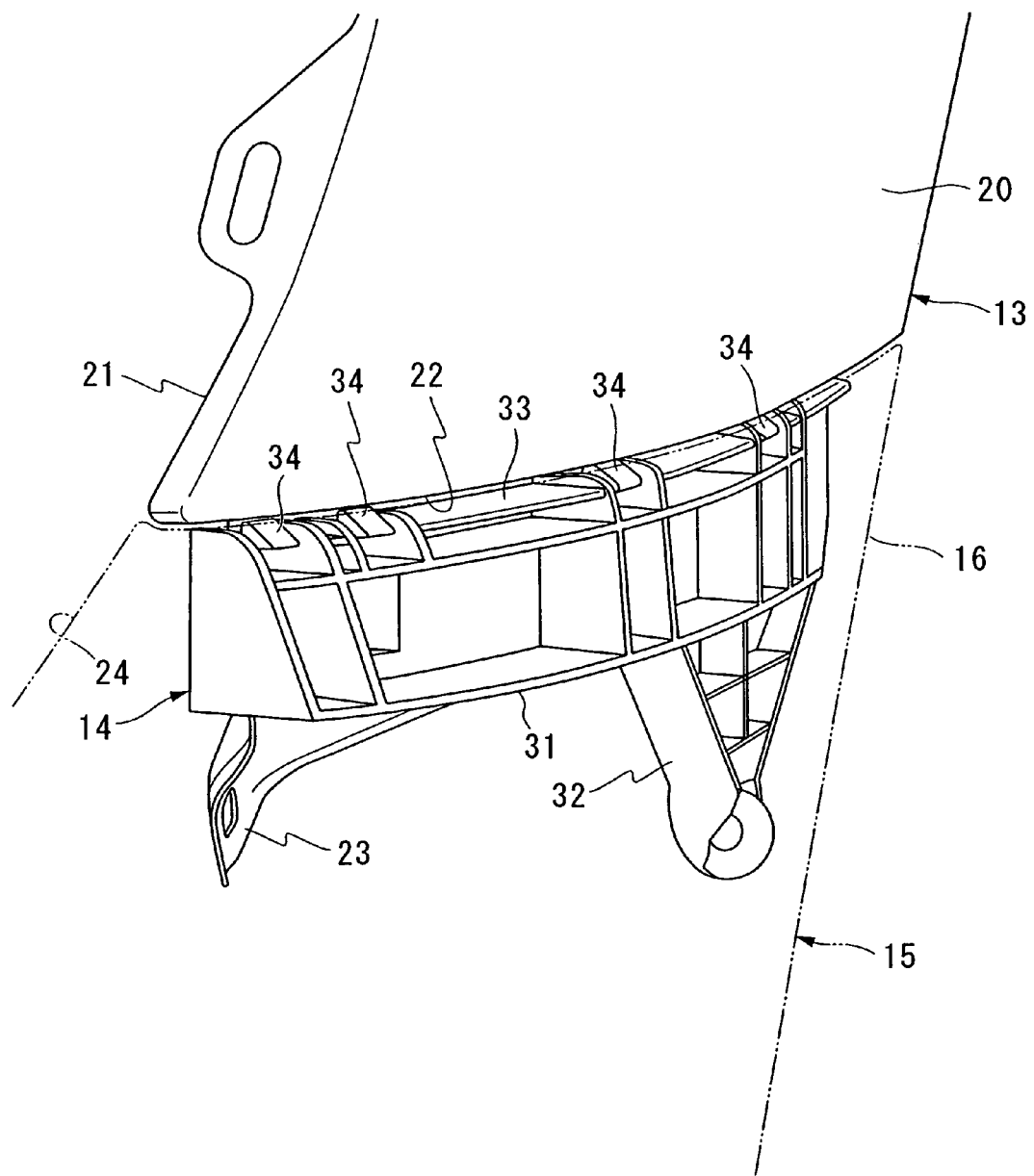
FIG. 2 is a perspective view showing the bumper mounting structure of an embodiment of the present invention.

As is shown in FIGS. 1 and 2, in the bumper mounting structure of the present embodiment, bumper spacers 14 are mounted respectively on outer sides in the vehicle transverse direction of a front end portion of two fender panels 13 that cover front wheels 12 of a vehicle 11. Side portions 16 that protrude towards the rear of a bumper 15 are mounted on both of the outer sides in the vehicle transverse direction of the bumper spacers 14. Namely, the bumper 15 is mounted on the fender panels 13 via the bumper spacers 14.

Figure 3:
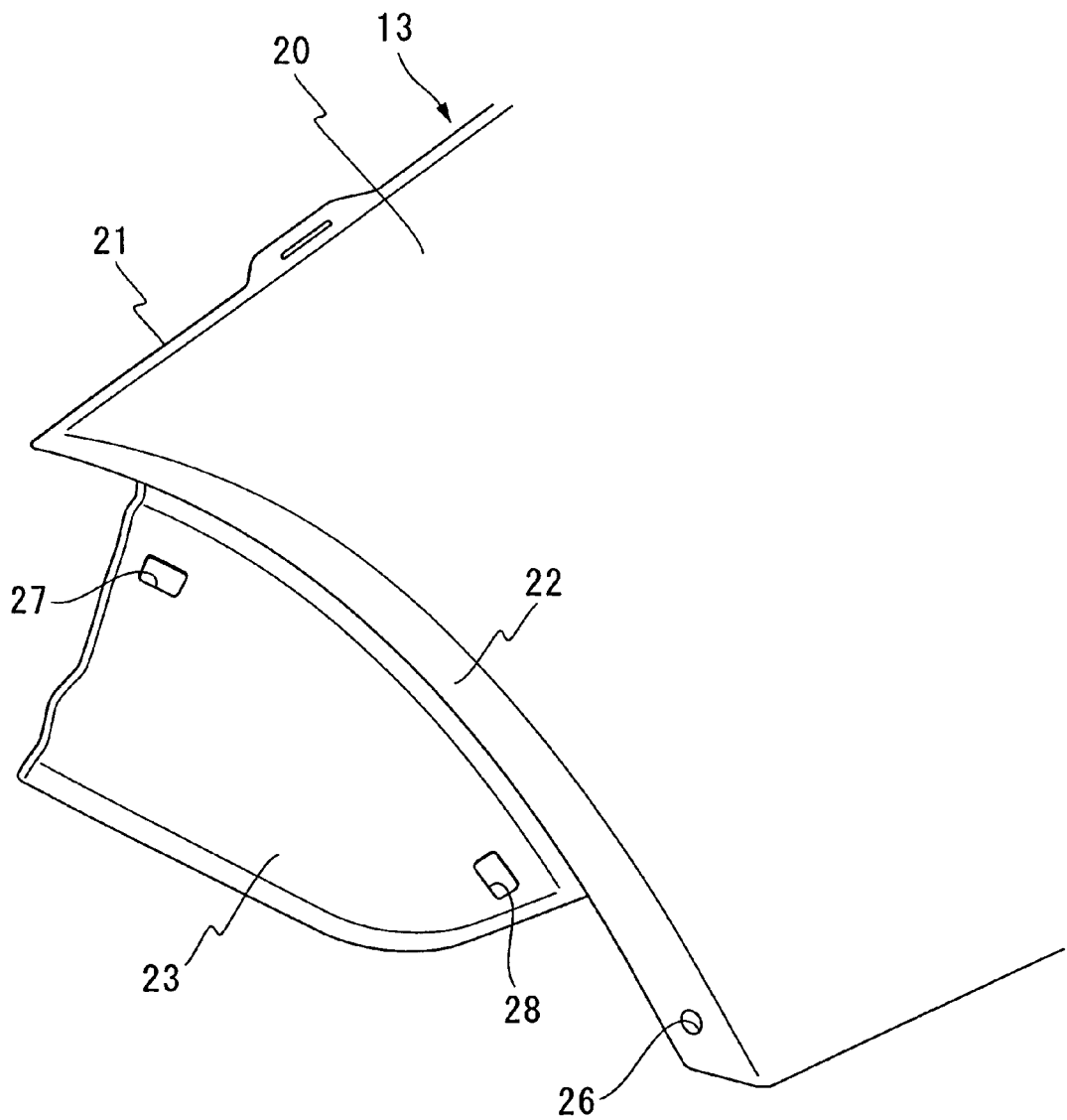
FIG. 3 is a perspective view showing the vicinity of a front edge portion of a fender panel that constitutes the bumper mounting structure of an embodiment of the present invention.

In a fender panel 13, a panel body portion 20 that constitutes a design surface is shaped such that a cutout portion 21 that is used for positioning a headlight 19 is formed in a top portion of a front portion thereof, and such that a front edge portion below the cutout portion 21 is curved in the vehicle transverse direction while sloping upwards towards the front. As is shown in FIG. 3, a bottom plate portion 22 is formed bent inwards in the vehicle transverse direction from a front edge portion of the raised front of the panel body portion 20, and a side plate portion 23 is formed bent forwards from an edge portion on the inner side in the vehicle transverse direction of the bottom plate portion 22. Note that, as is shown in FIG. 2, a bottom surface of the bottom plate portion 22 forms a line of partition with the bumper 15. Moreover, the side plate portion 23 faces an inward surface 24 in the vehicle transverse direction of the side portion 16 of the bumper 15.

As is shown in FIG. 3, a bottom plate mounting hole 26 that penetrates the bottom plate portion 22 is formed in a rear end side, which is one end side, of the bottom plate portion 22. Moreover, a plurality of, specifically, two side plate mounting holes 27 and 28 that penetrate the side plate portion 23 are formed respectively in a front portion and a rear portion of the side plate portion 23. Here, the bottom plate mounting hole 26 is a circular hole, while the side plate mounting holes 27 and 28 are square holes. The side plate portion 23 is formed only on the front side of the bottom plate mounting hole 26 in the bottom plate portion 22.

Figure 4:
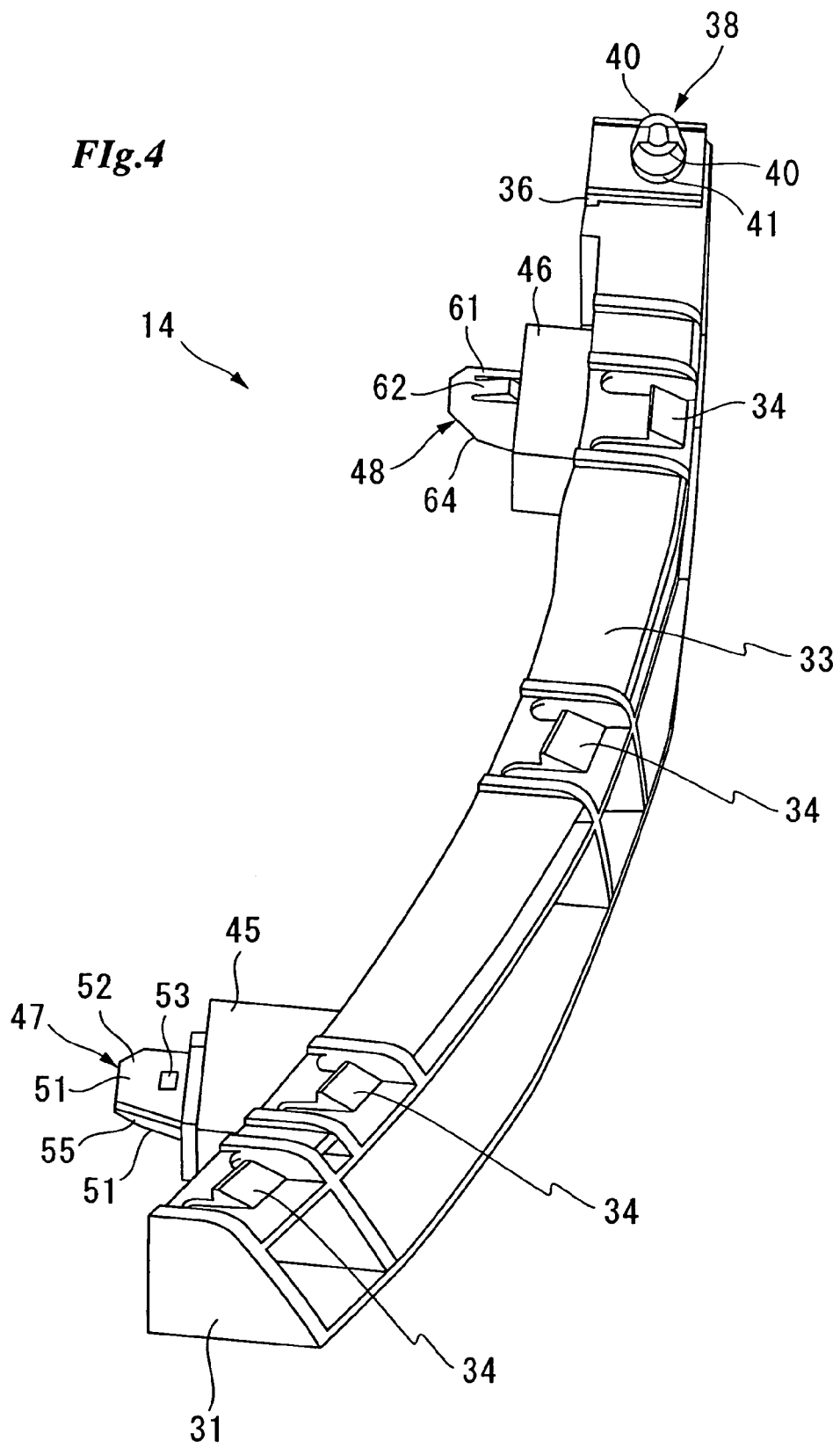
FIG. 4 is a perspective view as seen from above showing a bumper spacer that constitutes the bumper mounting structure of an embodiment of the present invention.
Figure 5:
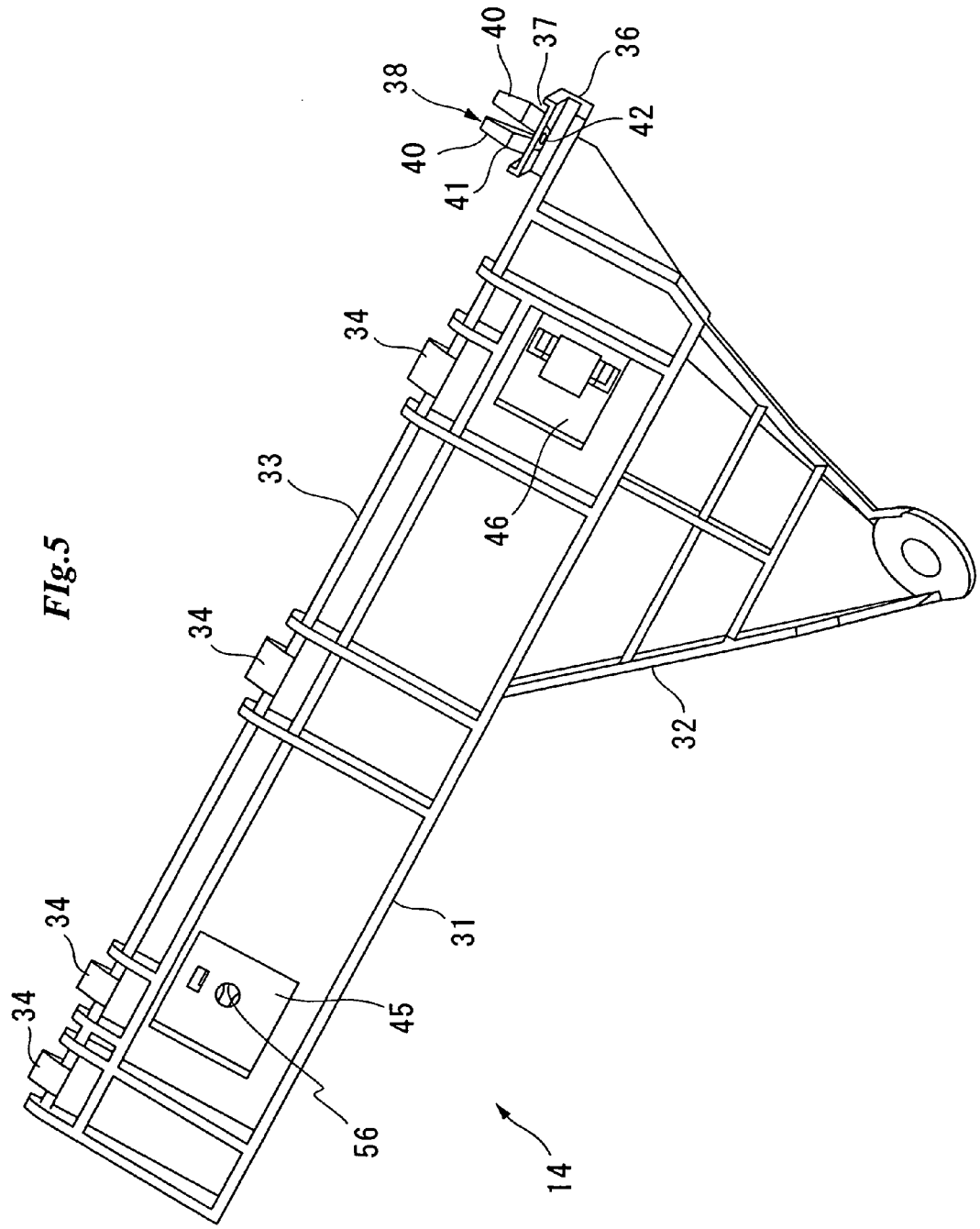
FIG. 5 is a side view showing a bumper spacer that constitutes the bumper mounting structure of an embodiment of the present invention.
Figure 6:
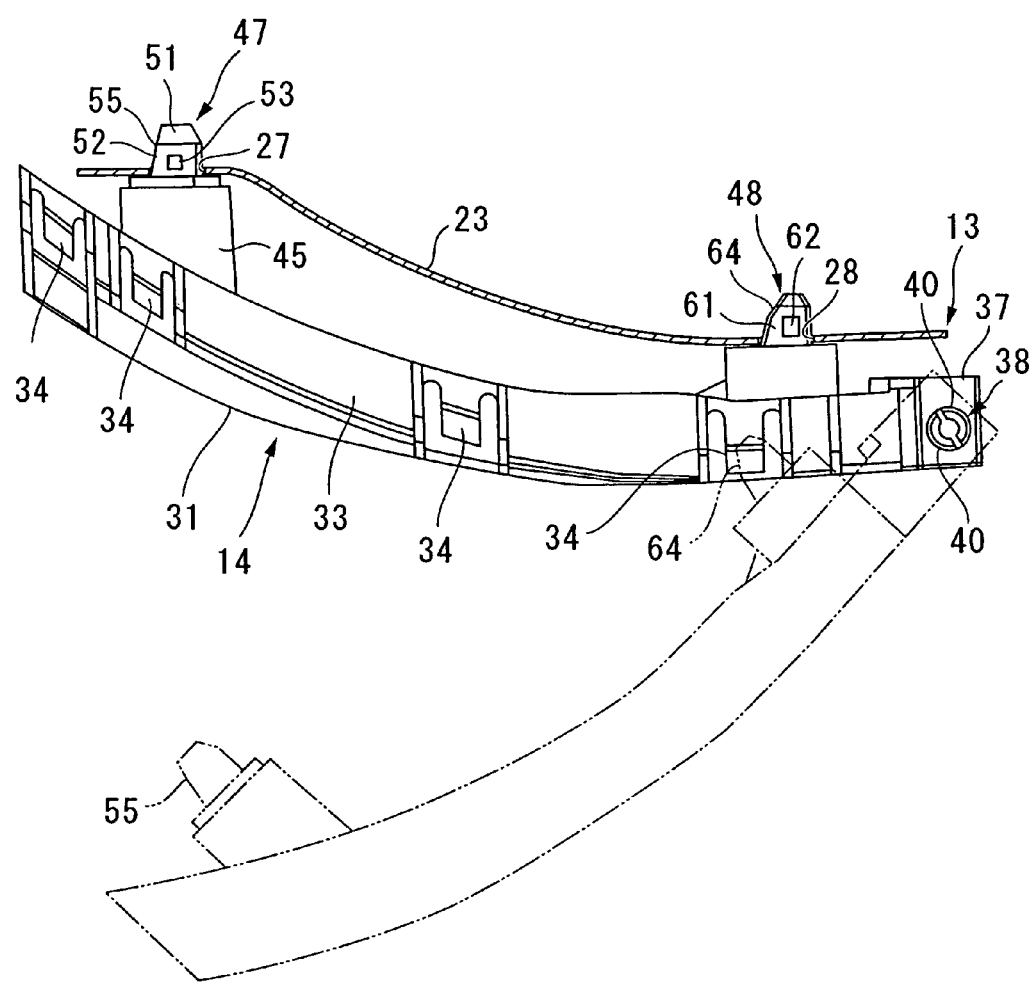
FIG. 6 is a cross-sectional view as seen from an obliquely upward direction showing a bumper spacer and a fender panel that constitute the bumper mounting structure of an embodiment of the present invention.

The bumper spacer 14 shown in FIGS. 4 to 6 is provided with a curved main portion 31 that is curved in the vehicle transverse direction and that extends so as to slope upwards at the front, and with a protruding portion 32 that protrudes downwards from a rear portion side, which is one side in the longitudinal direction, of the curved main portion 31.

A plurality of engaging claws 34 are formed at intervals in the front-rear direction on a top surface portion 33 that slopes upwards towards the front on an opposite side of the curved main portion 31 from the protruding portion 32. These engaging claws 34 protrude from the top surface portion 33 of the main curved portion 31 in a perpendicular direction relative to the top surface portion 33, and are shaped such that as the top surface thereof approaches the outer side in the vehicle transverse direction, the height of the protrusion above the top surface portion 33 becomes lower. The engaging claws 34 are also able to be displaced in a direction orthogonal to the top surface 33.

A leg plate portion 36 that protrudes slightly perpendicularly to the top surface portion 33 from an edge portion on an inner side in the vehicle transverse direction of the top surface portion 33, and a base plate portion 37 that is positioned in parallel with the top surface portion 33 and is bent outwards in the vehicle transverse direction from a top edge portion of the leg plate portion 36 are formed at a rear end portion, which is one end side, of the curved main portion 31. An upward protruding portion 38 that protrudes perpendicularly upwards from the base plate portion 37 (namely, perpendicularly upwards relative also to the top surface portion 33) is formed on the base plate portion 37.

This upward protruding portion 38 has a pair of engaging portions 40 that have been separated in the longitudinal direction. The overall shape when the two engaging portions 40 are combined is such that a large diameter portion 41 is formed slightly on the top surface portion 33 side of a central portion in the protrusion direction of the engaging portions 40, and in parallel with the top surface portion 33. The top surface portion 33 side of the engaging portions 40 beyond the large diameter portion 41 is formed in a tapered configuration that gradually narrows in diameter approaching the top surface portion 33 side. The opposite side of the engaging portions 40 from the top surface portion 33 beyond the large diameter portion 41 is formed in a tapered configuration that gradually narrows in diameter proceeding farther from the top surface portion 33.

Figure 7:
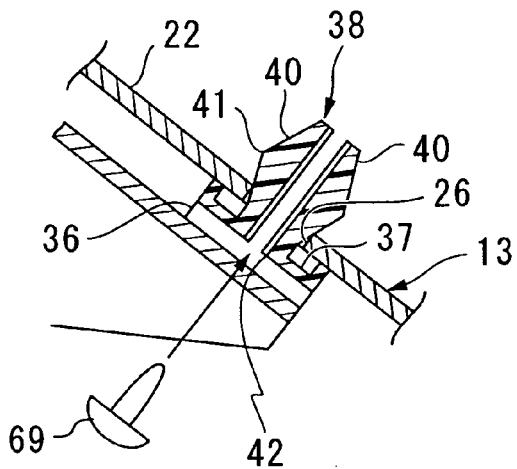
FIG. 7 is a side cross-sectional view showing the mounting on a fender panel of an upward protruding portion of a bumper spacer that constitutes the bumper mounting structure of an embodiment of the present invention.

As is shown in FIG. 7, the upward protruding portion 38 is fitted into the bottom plate mounting hole 26 in the bottom plate portion 22. The large diameter portion 41 is formed having a larger diameter than that of the bottom plate mounting hole 26. Accordingly, if the distal end portion of the upward protruding portion 38 is inserted into the bottom plate mounting hole 26, the large diameter portion 41 side thereof is pressed by internal circumferential portions of the bottom plate mounting hole 26, and the two engaging portions 40 are pushed together. When the large diameter portion 41 is moved past the bottom plate mounting hole 26, the engaging portions 40 return to their original state and are engaged in the bottom plate portion 22.

Note that a hole portion 42 that passes through the gap between the engaging portions 40 is formed in the upward protruding portion 38 penetrating from the bottom surface side of the base plate portion 37.

As is shown in FIG. 4 and FIG. 6, sideways protruding portions 47 and 48 that protrude inwards in the vehicle transverse direction are formed via base portions 45 and 46 respectively on an inner side in the vehicle transverse direction of a front portion of the curved main portion 31 and on an inner side in the vehicle transverse direction of a rear portion of the curved main portion 31 of the bumper spacer 14.

Figure 8:
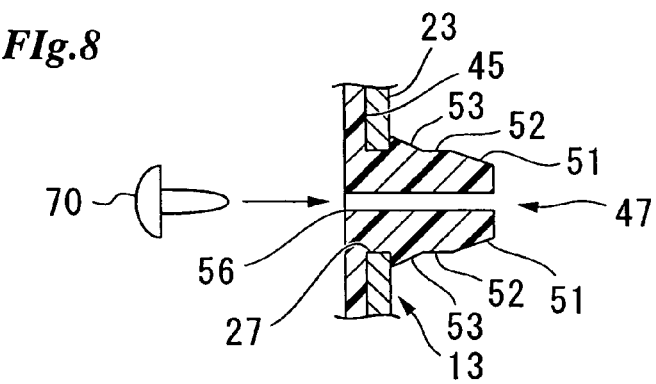
FIG. 8 is a cross-sectional view showing the mounting on a fender panel of one sideway protruding portion of a bumper spacer that constitutes the bumper mounting structure of an embodiment of the present invention.

As is shown in FIG. 8, the front sideways protruding portion 47 that is provided on the base portion 45 has a pair of engaging portions 51 that have been divided in a vertical direction. Surface portions 52 of the engaging portions 51 that oppose each other in the vertical direction of each are substantially parallel with the top surface portion 33 of the curved main portion 31. Engaging claws 53 that protrude perpendicularly relative to the surface portions 52 and that are shaped such that the height to which they protrude from the surface portions 52 becomes lower moving inwards in the vehicle transverse direction are respectively formed integrally with the surface portions 52.

The sideways protruding portion 47 is engaged with the front side plate mounting hole 27 in the side plate portion 23 of the fender panel 13. When being engaged the engaging claws 53 ride over an inner edge portion of the side plate mounting hole 27 and cause the engaging portions 51 to come together. When the engaging claws 53 move past the side plate mounting hole 27, the engaging portions 51 both return to their original state and the engaging claws 53 are engaged in the side plate portion 23.

As is shown in FIG. 6, a flat, obliquely sloping surface 55 that extends in a direction that is orthogonal to a virtual line connecting it with the center of the upward protruding portion 38 is formed on the sideways protruding portion 47 on the opposite side from the upward protruding portion 38. Note that a hole portion 56 that passes through the gap between the engaging portions 51 is formed in the sideways protruding portion 47 penetrating from the outer side in the vehicle transverse direction.

Figure 9:
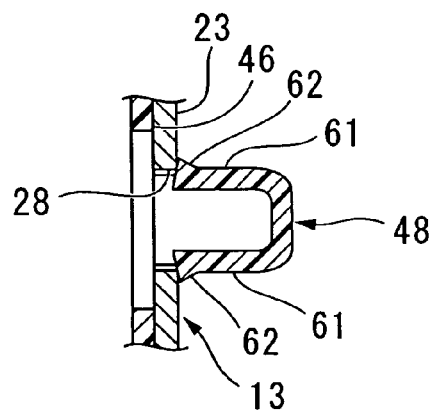
FIG. 9 is a cross-sectional view showing the mounting on a fender panel of another sideway protruding portion of a bumper spacer that constitutes the bumper mounting structure of an embodiment of the present invention.

In the rear sideways protruding portion 48, surface portions 61 that oppose each other in the vertical direction as seen in FIG. 9 are substantially parallel with the top surface portion 33 of the curved main portion 31. Engaging claws 62 that protrude perpendicularly relative to the surface portions 61 and that are shaped such that the height to which they protrude from the surface portions 61 becomes lower moving inwards in the vehicle transverse direction are formed on the respective surface portions 61 such that they are able to be displaced in a perpendicular direction relative to the surface portions 61.

The sideways protruding portion 48 is engaged with the rear side plate mounting hole 28 in the side plate portion 23 of the fender panel 13. When being engaged, the engaging claws 62 ride over an inner edge portion of the side plate mounting hole 28 and are displaced. When the engaging claws 62 move past the side plate mounting hole 28, they return to their original state and are engaged in the side plate portion 23.

As is shown in FIG. 6, a flat, obliquely sloping surface 64 that extends in a direction that is orthogonal to a virtual line connecting it with the center of the upward protruding portion 38 is formed also on the sideways protruding portion 48 on the opposite side from the upward protruding portion 38.

A bumper spacer 14 having the above described configuration is molded integrally with the upward protruding portion 38 and the sideways protruding portions 47 and 48 from a synthetic resin material.

Figure 10:
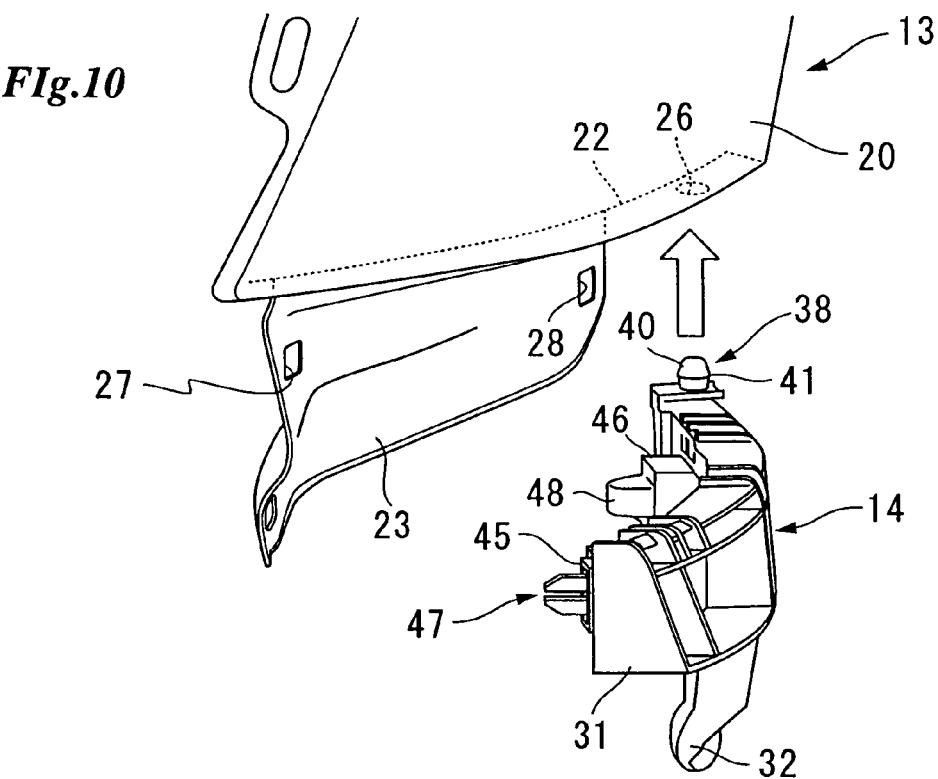
FIG. 10 is a perspective view showing a procedure for mounting on a fender panel a bumper spacer that constitutes the bumper mounting structure of an embodiment of the present invention.

When a bumper spacer 14 having the above described configuration is mounted on the fender panel 13, firstly, in a state in which, as is shown in FIG. 10, the side of the bumper spacer 14 that is on the opposite side from the upward protruding portion 38 is separated from the fender panel 13 in the vehicle transverse direction, the upward protruding portion 38 that is formed on a rear end side of the bumper spacer 14 is engaged in the bottom plate mounting hole 26 that is formed on a rear end side of the bottom plate portion 22 of the fender panel 13, as is shown in FIG. 7. As a result, because the upward protruding portion 38 has a circular cross section and the bottom plate mounting hole 26 also has a circular configuration, the bumper spacer 14 is able to be rotated around the upward protruding portion 38 and the bottom plate mounting hole 26.

Figure 11:
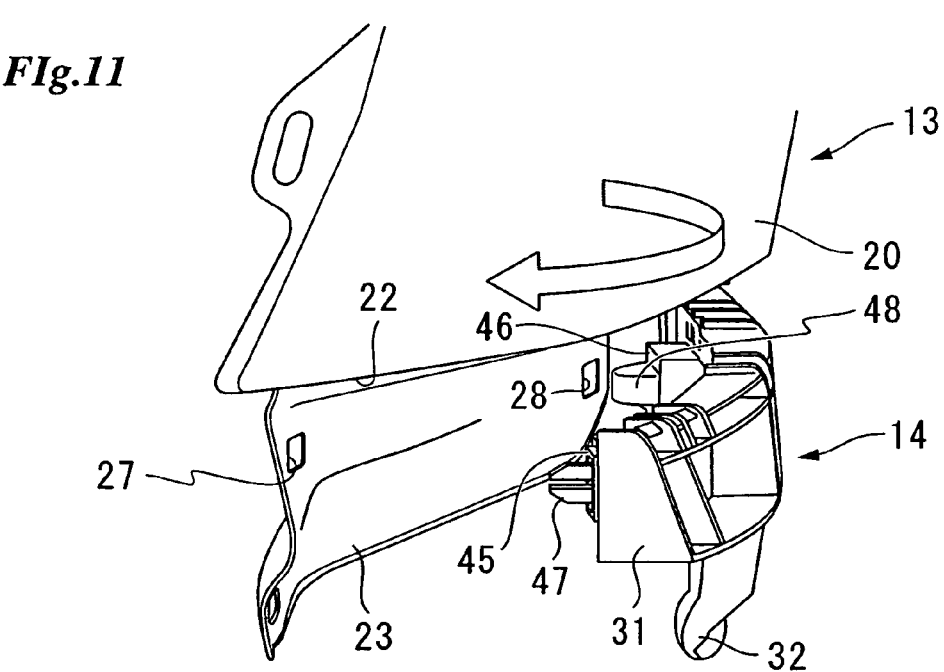
FIG. 11 is a perspective view of a state after that shown in FIG. 10, showing a procedure for mounting on a fender panel a bumper spacer that constitutes the bumper mounting structure of an embodiment of the present invention.
Figure 12:
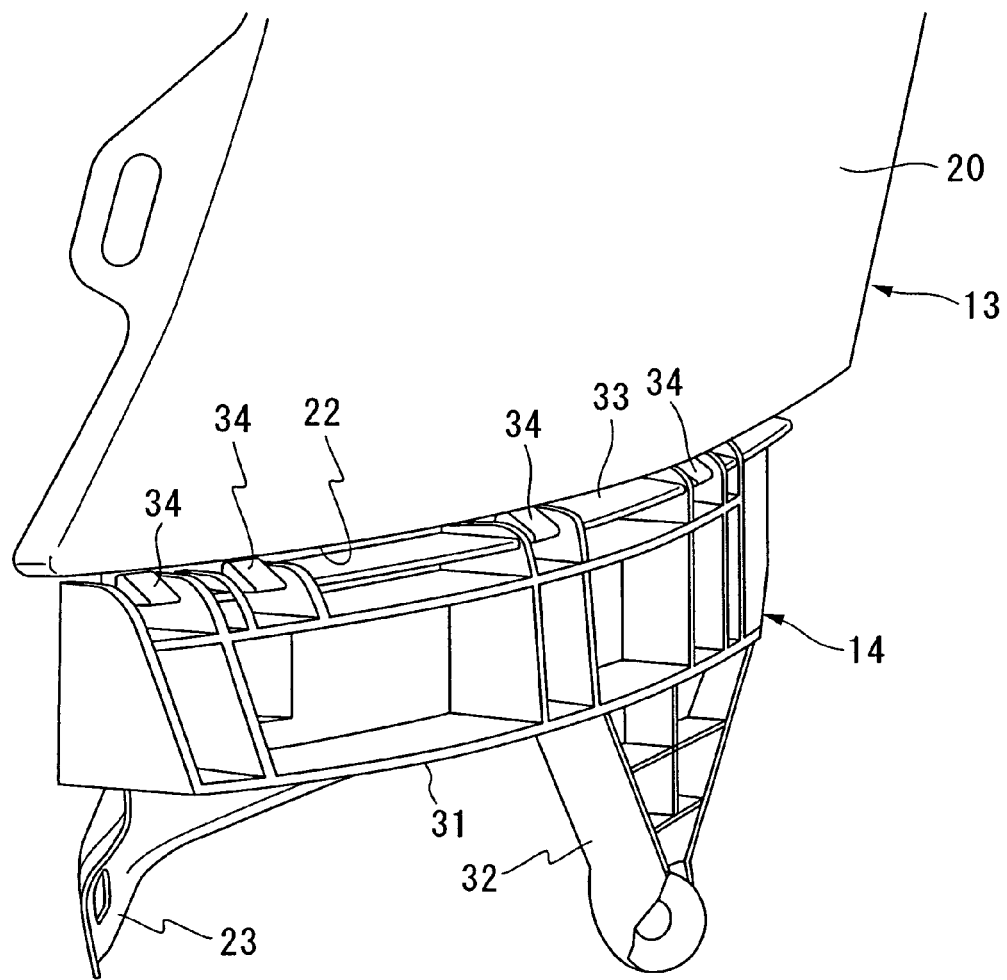
FIG. 12 is a perspective view of a state after that shown in FIG. 11, showing a procedure for mounting on a fender panel a bumper spacer that constitutes the bumper mounting structure of an embodiment of the present invention.

From the state shown in FIG. 11 in which the upward protruding portion 38 is fitted into the bottom plate mounting hole 26 in this manner, if the bumper spacer 14 is rotated around the upward protruding portion 38 and the bottom plate mounting hole 26 such that the opposite side of the bumper spacer 14 from the side where the upward protruding portion 38 is located is moved inwards in the vehicle transverse direction thereby achieving the state shown in FIG. 12, then there is a transition from the state shown by the double dot chain line in FIG. 6 to the state shown by the solid line in FIG. 6, and the sideways protruding portion 47 of the bumper spacer 14 is fitted into the side plate mounting hole 27 while interference between the sideways protruding portion 47 and the side plate mounting hole 27 that is formed in the side plate portion 23 of the fender panel 13 is eliminated due to the undercut of the oblique surface 55 of the sideways protruding portion 47. In addition, the sideways protruding portion 48 of the bumper spacer 14 is fitted into the side plate mounting hole 28 while interference between the sideways protruding portion 48 and the side plate mounting hole 28 that is formed in the side plate portion 23 of the fender panel 13 is eliminated due to the undercut of the oblique surface 64 of the sideways protruding portion 48. Namely, the engaging claw 53 of the sideways protruding portion 47 is engaged on the inner side in the vehicle transverse direction of the side plate portion 23, as is shown in FIG. 8, and the engaging claw 62 of the sideways protruding portion 48 is engaged on the inner side in the vehicle transverse direction of the side plate portion 23, as is shown in FIG. 9.

If a screw 69 is then screwed between the engaging portions 40 of the sideways protruding portion 38 via the hole portion 42, as is shown by the arrow in FIG. 7, the engaging portions 40 are moved apart from each other. As a result, the sideways protruding portion 38 is engaged without any rattling in the bottom plate mounting hole 26. Moreover, as is shown by the arrow in FIG. 8, by screwing a screw 70 between the engaging portions 51 of the sideways protruding portion 47 via the hole portion 56, as is shown by the arrow in FIG. 8, the engaging portions 51 are moved apart from each other and the sideways protruding portion 47 is engaged without any rattling in the side plate mounting hole 27.

Figure 13:
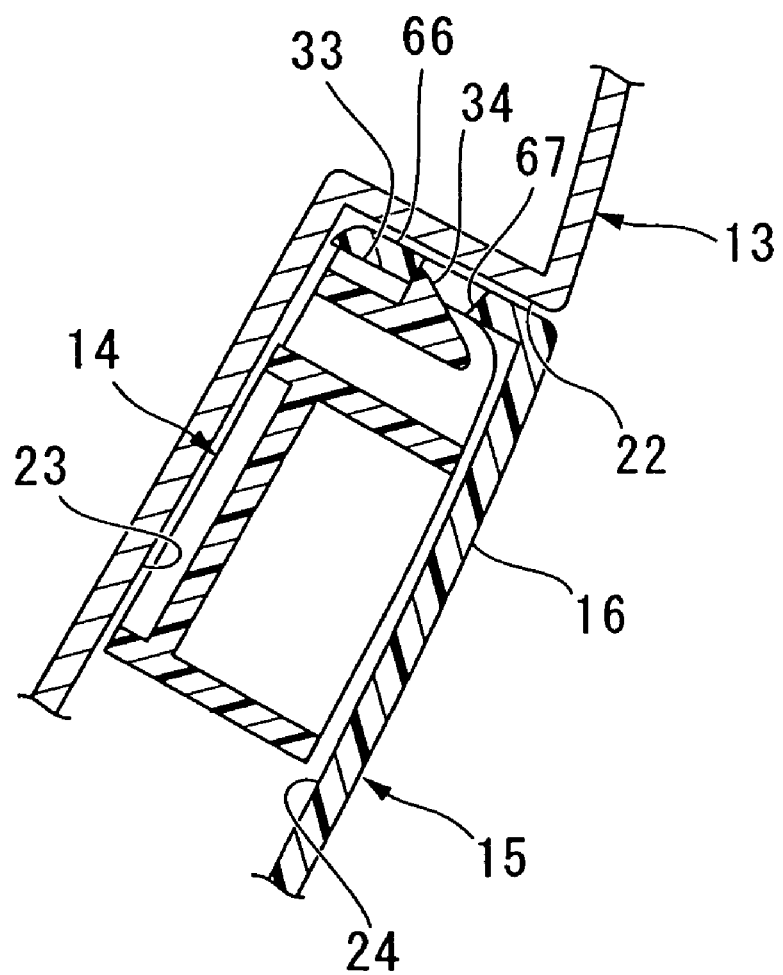
FIG. 13 is a cross-sectional view showing a state in which a bumper is mounted on a bumper spacer in the bumper mounting structure of an embodiment of the present invention.

As is described above, if a flange portion 66 that is bent inwards in the vehicle transverse direction from a rear edge portion of the side portion 16 of the bumper 15 is engaged, as is shown in FIG. 13, in a gap that is formed between the top surface portion 33 of the bumper spacer 14 that is mounted on the fender panel 13 and the bottom plate portion 22 of the fender panel 13, the engaging claw 34 of the bumper spacer 14 is engaged in the engaging hole 67 formed in the flange portion 66, and the bumper 15 is placed in a state of being mounted on the fender panel 13 via the bumper spacer 14.

According to the bumper mounting structure of the present embodiment that has been described above, the upward protruding portion 38 that is formed at one end side of the bumper spacer 14 is fitted into the bottom plate mounting hole 26 that is formed in one end side of the bottom plate portion 22, which forms a line of partition between the fender panel 13 and the bumper 15. If the bumper spacer 14 is then rotated around the upward protruding portion 38, the sideways protruding portions 47 and 48 of the bumper spacer 14 are fitted into the side plate mounting holes 27 and 28 that are formed in the side plate portion 23 of the fender panel 13 that faces the inward surface 24 in the vehicle transverse direction of the bumper 15. In this manner, because the bumper spacer 14 is mounted via the sideways protruding portions 47 and 48 onto the side plate portion 23 of the fender panel 13, and is also mounted via the upward protruding portion 38 onto the bottom plate portion 22 of the fender panel 13, it is possible to improve the accuracy with which the bumper spacer 14 is mounted onto the fender panel 13. Accordingly, because it is not necessary to mount independent grommets in the bottom plate mounting hole 26 in the fender panel 13, the number of components can be decreased and the mounting task can be simplified. In addition, because the upward protruding portion 38 that is formed at one end side of the bumper spacer 14 is fitted into the bottom plate mounting hole 26 that is formed in one end side of the bottom plate 22 of the fender panel 13, visual confirmation is easy and the fitting is also made easy. Moreover, if the bumper spacer 14 is subsequently rotated around the upward protruding portion 38, the sideways protruding portions 47 and 48 can be automatically fitted into the side plate mounting holes 27 and 28 in the fender panel 13. Accordingly, the mounting task can be further simplified.

Moreover, because the oblique surfaces 55 and 64 that prevent interference with the side plate mounting holes 27 and 28 during the rotation mounting are formed on the sideways protruding portions 47 and 48 on an opposite side thereof from the upward protruding portion 38, during the rotation mounting the sideways protruding portions 47 and 48 can be prevented from interfering with the side plate mounting holes 27 and 28. Moreover, in an engaged state, the sideways protruding portions 47 and 48 can be fitted into the side plate mounting holes 27 and 28 with the minimum possible gap between them. Note that the oblique surfaces 55 and 64 are not limited to the above described flat surfaces, and may also be formed as curved surfaces centered on the center of the upward protruding portion 38, or as a combination of a flat surface and a curved surface.

In addition, because the bumper spacer 14 is molded integrally with the upward protruding portion 38 and the sideways protruding portions 47 and 48, the number of components can be decreased and a reduction in costs can be achieved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A bumper mounting structure for mounting a bumper on a fender panel via a bumper spacer, comprising:
    a bottom plate mounting hole provided in one end side of a bottom plate portion of the fender panel, the bottom plate portion forming a line of partition between the fender panel and the bumper;
    a side plate mounting hole provided in a side plate portion of the fender panel facing an inward surface in a vehicle transverse direction of the bumper;
    an upward protruding portion that is rotatably fittable in the bottom plate mounting hole, provided on one end side of the bumper spacer; and
    a sideways protruding portion provided on the bumper spacer that, in a state in which the upward protruding portion has been fitted in the bottom plate mounting hole, is fittable into the side plate mounting hole when the bumper spacer is rotated around the upward protruding portion.

2. The bumper mounting structure according to claim 1, further comprising an oblique surface formed on the sideways protruding portion on an opposite side thereof from the upwards protruding portion, the oblique surface eliminating interference between the sideways protruding portion and the side plate mounting hole during a rotation mounting.

3. The bumper mounting structure according to claim 1, wherein the bumper spacer is molded integrally with the upward protruding portion and the sideways protruding portion.

4. The bumper mounting structure according to claim 2, wherein the bumper spacer is molded integrally with the upward protruding portion and the sideways protruding portion.

* * * * *